Aug. 9, 1955     F. W. E. HOESELBARTH     2,714,902
MULTIPLE PILE STAGGERED W-WEAVING
Filed Oct. 16, 1950     4 Sheets-Sheet 1
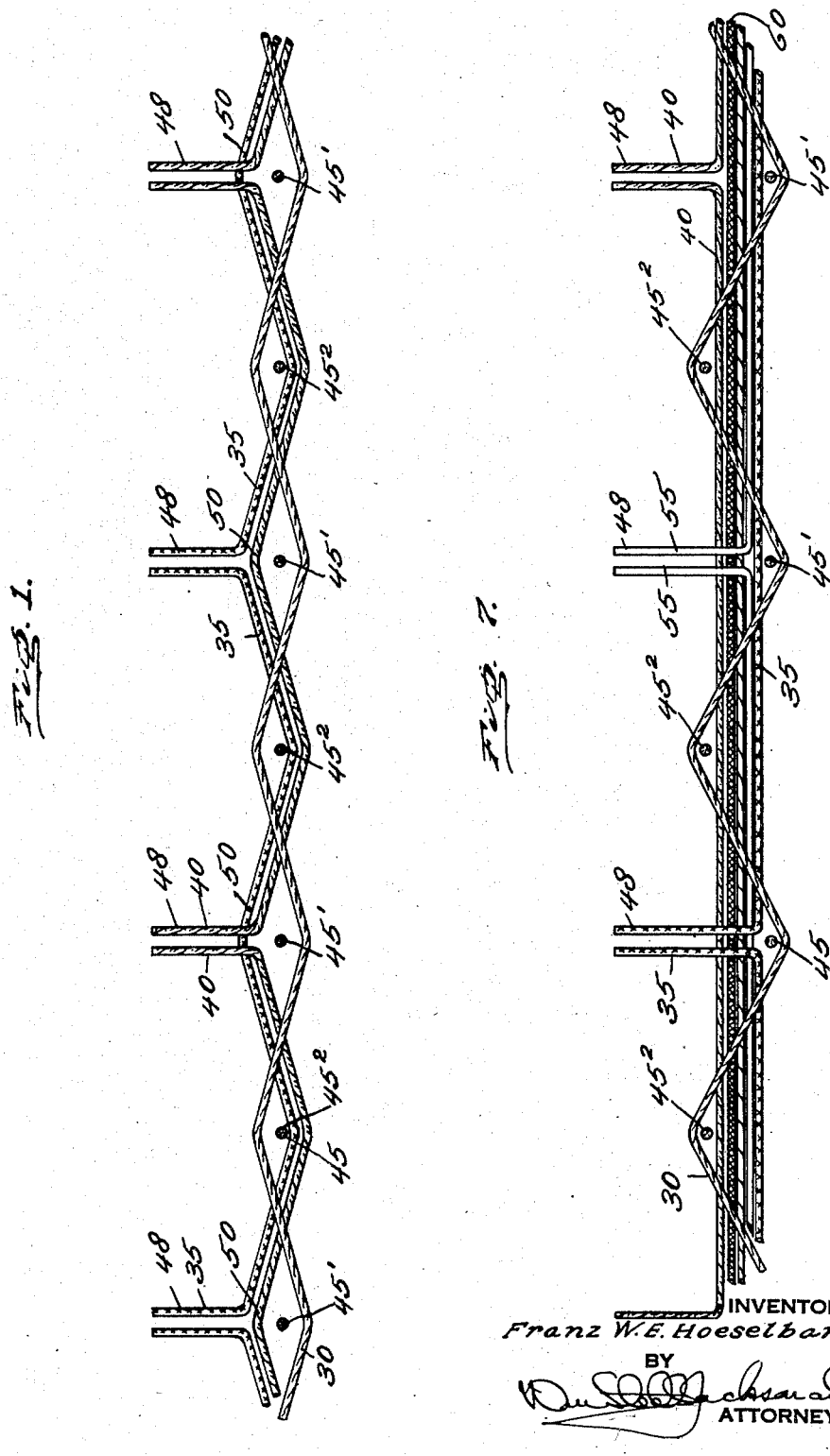
INVENTOR
Franz W. E. Hoeselbarth.
BY
ATTORNEYS.

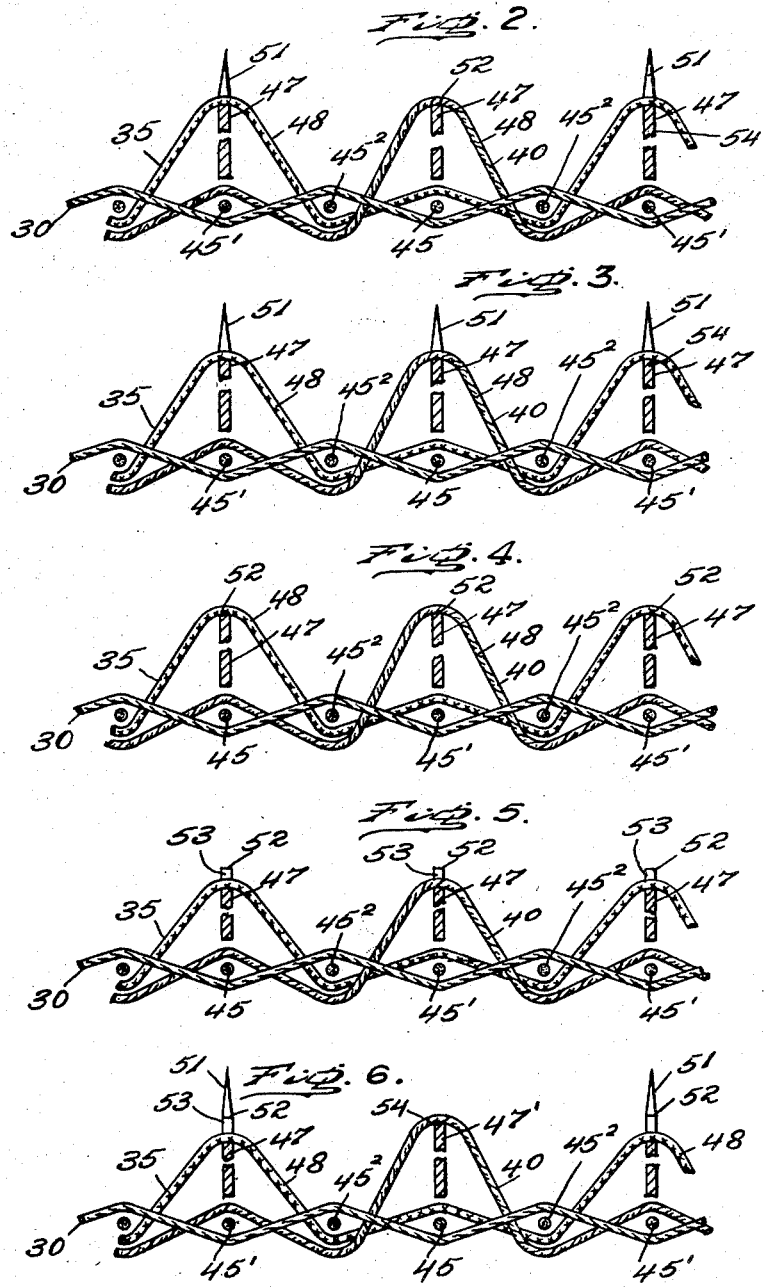

Fig. 8.

| | Pile Warp A | Pile Warp B | Single Binder Warp | Stuffer Warp |
|---|---|---|---|---|
| 1 | • • | • • | • • | |
| 2 | • • | • • | • | • • |
| 3 | • • • | • • • | • | • • • |
| 4 | • | • | • | • |
| 5 | • • • | • • • | • | • |
| 6 | • | • | • • | • |
| 7 | • | • | • | • • |

Aug. 9, 1955   F. W. E. HOESELBARTH   2,714,902
MULTIPLE PILE STAGGERED W-WEAVING
Filed Oct. 16, 1950   4 Sheets-Sheet 4

| Thread In | Dent | 1 | 2 | 3 | 4 | 5 | 6 |
|---|---|---|---|---|---|---|---|
| 1 | Pile A | • | • | • | • | • | • |
|   | Pile B | • | • | • | • | • | • |
| 2 | Pile A | • • | • • | • • | • • | • • | • • |
|   | Pile B | • • | • • | • • | • • | • • | • • |
| 3 | Pile A | • |   | • |   | • |   |
|   | Pile B |   | • |   | • |   | • |
| 4 | Pile A | • • |   | • • |   | • • |   |
|   | Pile B |   | • • |   | • • |   | • • |
| 5 | Pile A | • |   |   | • |   |   |
|   | Pile B |   | • |   |   | • |   |
|   | Pile C |   |   | • |   |   | • |
| 6 | Pile A | • • |   |   | • • |   |   |
|   | Pile B |   | • • |   |   | • • |   |
|   | Pile C |   |   | • • |   |   | • • |

INVENTOR
Franz W.E. Hoeselbarth.

ATTORNEYS.

United States Patent Office 2,714,902
Patented Aug. 9, 1955

2,714,902

MULTIPLE PILE STAGGERED W-WEAVING

Frank W. E. Hoeselbarth, Carlisle, Pa., assignor to C. H. Masland & Sons, Carlisle, Pa., a corporation of Pennsylvania Application October 16, 1950, Serial No. 190,280

5 Claims. (Cl. 139—403)

The present invention relates to pile fabrics and especially to carpets and rugs.

The present application has been divided, the claims on the fabric being retained in the present application and the claims on the method and apparatus being embodied in application Serial No. 274,568, filed March 3, 1952, for Multiple Pile Staggered W-Weave.

A purpose of the invention is to obtain a tighter weave in pile fabrics, especially carpets and rugs.

A further purpose is to secure a desirable textured effect at the face and also the back of a pile fabric, especially a carpet or rug.

A further purpose is to economize on the material required in weaving a carpet or rug.

A further purpose is to make the pile warps perform the function of one of the binder warps in a pile fabric such as a carpet or rug, weaving them oppositely to a single binder warp.

A further purpose is to interweave a pile warp by a staggered W-weave which holds the wefts by a single bindery warp without the necessity of employing a second binder warp.

A further purpose is to break up the longitudinal lined effect in the face of a carpet or rug, by threading in the ends of different pile warps in different dents, suitably alternating for the different pile warps.

A further purpose is to employ a stuffer warp woven oppositely to a single binder warp.

A further purpose is to utilize cut, uncut or a combination of cut and uncut pile projections in a weave utilizing a single binder warp woven in opposition to at least two pile warps.

A further purpose is to employ varying heights of pile projections in the same transverse row in a weave using a single binder warp woven in opposition to pile warps.

A further purpose is to weave with a single binder warp in opposition to at least two pile warps and at least one stuffer warp.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a warpwise diagram of one form of the completed weave of the invention after the wires have been removed.

Figures 2–6 inclusive are warpwise diagrams showing various weaves according to the invention prior to the removal of the wires, and indicating various forms of the finished fabric.

Figure 7 is a warpwise weave diagram of a velvet weave according to the invention.

Figure 8 is a thread-in diagram for all the warps showing various thread-in combinations of the invention.

In the drawings like numerals refer to like parts throughout.

Figure 9:
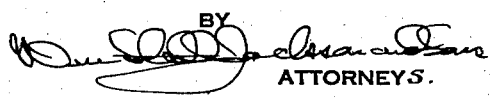
Figure 9 is a thread-in diagram for the pile warps, showing the relations in adjoining dents.

Describing in illustration but not in limitation and referring to the drawings:

W-weaves are known in which the points at which successive warps are raised in the pile are displaced to create a staggered relationship. See for example Craddock U. S. Patent No. 1,208,101 and Morgan U. S. Patent No. 2,060,103. Such weaves are adaptable for various types of rugs and carpets. It is very desirable to obtain a tighter weave and at the same time to improve the appearance and reduce the amount of material and mechanism required.

In accordance with the present invention I employ in a velvet or tapestry carpet weave or in a Wilton or Brussels, a single binder or fine chain warp, and weave this in opposition to the pile warps and to the stuffer warp if any. At least two, and suitably more pile warps are raised successively in the pile on each cycle. Since each pile warp is interwoven with at least three wefts between any two points at which it is raised in the pile and since the positions at which pile projections are raised correspond to adjoining face weft positions (the next pile row being raised at the second weft), it will be evident that a staggered relation exists between the pile projections of the different warps and each warp is interwoven in a W-weave.

Since the usual second binder or fine chain warp is eliminated entirely, a tighter fabric is obtained. The space which is normally occupied by the second fine chain warp can to advantage be occupied by additional ends of the single fine chain warp, or of pile warps or of stuffer warps, or of any or all three, passing through the same dent and accordingly there can be one, two or three or more ends per dent of binder warp, pile warp or stuffer warp, as later explained. The thread-in of the pile warps suitably alternates in the successive dents. It will be evident, however, that other thread-ins may be used, in which for example a group of adjoining dents have ends of a particular pile warp, and then the next dent or dents has or have ends of another pile warp.

By eliminating the one fine chain warp or binder warp, material is saved, and the mechanism is simplified, since one binder warp heddle is unnecessary and the labor incident to threading one binder warp is saved. On a velvet carpet loom weaving with two pile warps, the production is doubled over the same loom weaving with one pile warp. I may, if desired, employ this economy in material to reduce the cost of the fabric or I may correspondingly increase the number of ends per dent of some other warp or warps and produce a superior fabric without corresponding increase in cost, for example by obtaining increased density of pile.

A further advantage of the weave of the invention is that the projections incident to the appearance of the second binder warp at the back of the fabric no longer exist, but the pile warps are visible instead at intervals at the back of the fabric, since they are woven in opposition to the single binder warp, and the points of appearance of the usually colored pile warps at the back of the fabric create an attractive textured effect and improve the usual drab appearance of the back of the fabric.

The invention is applicable to fabrics having various types of pile projections, such as cut, uncut, cut and uncut, high, low, high and low, and wavy pile projections in the same transverse row. Insofar as high, low, and wavy pile projections are used, the present invention may be regarded as a further development of C. H. Masland patent application Serial No. 144,764, filed February 17, 1950, for Weaving with Effect from Orientation of High and Low Pile, and my U. S. patent applications Serial No. 167,534, filed June 12, 1950, for Velvet or Tapestry Weave Loom and Velvet or Tapestry Carpet Fabric and Serial No. 168,960, filed June 19, 1950, for Pile Carpet and Process of Weaving, which are incorporated herein by reference.

In accordance with the invention, where washable rugs are being made, all of the warps and wefts may desirably be of cotton. For other types of rugs and carpets and also for washable rugs, where price may permit, any of the usual carpet textile materials may be employed, the pile warps for example being of carpet wool or synthetic fiber such as cellulose ester or ether or linear polyamide (nylon), the binder warp being of cotton, rayon or jute and the stuffer warp, if any, being of jute, rayon or cotton.

The weave will include binder warp ends under a crimp (as measured according to A. S. T. M. Specification D39–49) between 25 and 50 percent. The crimp of the stuffer warp ends (if any) in the weave will be less than 15 percent, and preferably between 3 and 8 percent. In weaving, a greater tension will preferably be used on the stuffer warp ends than on the binder warp ends.

Figure 1 shows a velvet or tapestry carpet weave which is shown in variation in Figures 2 to 6. A single binder warp 30 is woven in opposition to the pile warp. A single end of binder warp 30 will preferably be used in each dent of the reed (in each course) but it is desirable in some cases to use a plurality of ends of the single binder warp per dent, suitably two, but permissibly three or more ends per dent.

Pile warp 35 of any suitable color, which may or may not contrast with the other pile warp or warps is woven in opposition to the binder warp. The individual dents of the reed (courses) may carry only a single end of pile warp 35, but in the preferred embodiment two ends are used in each dent, adding to the density of the pile, and in many cases it may be desirable, in accordance with the invention, to employ three or more ends of pile warp 35 per dent. At least one other pile warp besides pile warp 35 is employed in the invention. I illustrate pile warp 40. While there may be a single end of pile warp 40 in each dent, in the preferred embodiment a plurality of ends will be used in each dent, suitably 2, 3 or more ends per dent. Also as later explained, the thread-in is desirably alternated in the dent to break up longitudinal striations.

Considering Figure 1, it will be evident that in one step the binder warp is raised half way, while the pile warps are lowered, forming a lower shed in which a shot of weft 45 is inserted by the shuttle as well known. In the next step, the binder warp is lowered, one pile warp is fully raised and another pile warp is raised half way, forming an upper shed and a lower shed. A wire 47 of one of the characters shown herein is inserted in the upper shed beneath the raised pile warp and above all other warps, while a shot of weft is taken in the lower shed above the binder warp and beneath all other warps. In the third step, the binder warp is raised half way and the pile warps are lowered, forming a lower shed in which a shot of weft 45 is taken. In the fourth step, the other pile warp is fully raised, and the first pile warp is raised half way, and the binder warp is lowered, forming an upper shed and a lower shed. Wire 47 of any of the characters herein discussed is inserted in the upper shed beneath the raised pile warp and above all other warps and a shot of weft is inserted in the lower shed. Figure 1 shows the result after withdrawal of the wires.

In the final woven fabric opposite each back weft 45', a row of pile projections 48 are raised, extending transversely of the fabric. The pile projections shown in Figure 1 happen to be cut but it will be recognized that they may be cut or uncut or cut and uncut as later explained. The pile projections shown in Figure 1 are also all of the same height, but it will be understood that they can be of different heights as later indicated.

In between each back weft 45' is a face weft 45² and the weave conforms to a staggered W-weave in that each pile warp, after being raised in a pile projection 48, passes behind a face weft, in front of next back weft and behind the next face weft before it is again raised in a pile projection. There being only two pile warps in Figure 1, it will be evident that a pile warp is raised in a pile projection opposite each fourth weft. Where the number of pile warps is increased, the frequency of raising a particular pile in a pile projection will be decreased as later explained, but the pile warps will be raised successively as shown.

It will be noted in Figure 1 that the pile warps follow together (except as an individual pile warp is raised in the pile) and are in opposition to the binder warp, so that whenever the single binder warp is under a weft the pile warps are over it, and whenever the single binder warp is over a weft the pile warps are under it. This is an important feature because, at points opposite the pile projections where no stuffer warp is used as in Figure 1, the back wefts 45' are held in at the front of the fabric solely by the pile warp or warps at 50, which are in the backing of the fabric (subject of course to the fact that where the pile is uncut the back weft would not completely escape because of the pile projections, but except for the pile warp at 50 would be free to leave the backing of the fabric and destroy the integrity of the structure).

It will be evident that in the form of Figure 1 the pile warps may be of the same or different color as desired.

It will be evident that any or all of the wires employed in the weave of the present invention may be cutting or non-cutting and the fabric produced may be cut, uncut or partially cut and partially uncut as preferred.

In Figure 2 I illustrate a velvet or tapestry pile carpet having a series of wires 47 in place in pile projections 48 of transverse rows and consisting of cutting wires having spoons and blades 51 as well known, alternating with non-cutting wires 52 having smooth upper surfaces and forming uncut pile. The resulting fabric of Figure 2 is accordingly a mixture of alternate rows of cut tufts and rows of uncut pile loops. It will be understood that this combination of cutting and non-cutting wires in any order may be utilized with any of the other features of Figures 3 to 9 inclusive, it being desired to avoid a duplication of drawings required to show each variation in combination with the cutting and non-cutting wires.

In Figure 3 I illustrate a tapestry pile carpet having cutting wires throughout to produce a pile fabric which is entirely cut. It will be understood that the features of Figure 3 can be utilized with any of the features of Figures 1, 2 and 4 to 9 inclusive without the necessity of illustrating each feature separately in combination with the cutting wires of Figure 3.

In Figure 4 I illustrate a tapestry pile carpet in which the pile is raised entirely over non-cutting wires 52, it being evident that the non-cutting wire feature of Figure 4 may be used with any of the features of Figures 1 to 3 or 5 to 9 without the necessity of separate illustration of the combination.

In Figures 2 to 4 the upper surfaces of the wires over which the pile is formed are straight. It will be evident, however, that wavy wires can be used as shown in the patent applications to which cross reference is made, having wavy upper portions 53 suitably out of phase with one another in pattern effect, which, on withdrawal of the wires, result in pulling down loops in adjoining transverse rows of pile projections and forming pile projections of different heights in the same transverse row of pile projections as shown in the patent applications above referred to. The wires of Figure 5 are non-cutting, but it will be understood that the features of Figure 5 can be employed with any of the features of Figures 1 to 4 or 6 to 9 inclusive without departing from the invention.

In some cases it is desired to use cutting wires or combinations of cutting and non-cutting wires in wavy wire sets and this is suggested generally by Figure 6 showing a velvet or tapestry carpet weave. Figure 6 also illustrates that a straight wire 54 may, if desired, be used alternately with a wavy wire 53 throughout the wire set so that each alternate transverse row is formed over a wavy wire and the next alternate transverse row is formed over a straight wire, and the rows formed over straight wires are pulled down to varying degrees, depending upon the character of the adjoining wavy wire, when the wavy wire is withdrawn from the fabric.

It will be evident that the features of Figure 6 may be used with any of the features of Figures 1 to 5 or 7 to 9 without departing from the spirit of the invention.

To indicate that the individual wires, whether straight or wavy, cutting or non-cutting, need not all be of the same height, I illustrate in Figures 2 to 6 breaks in the wires. These breaks are intended to indicate without repetition of figures that any wire can be lower or higher than any other wire of the wire set.

As already explained generally, the weave of the invention contemplates that at least two pile warps will be used, but the number of pile warps may be greater than two, for example, 3, 4, 5 etc. The weave of Figure 7 illustrates the use of three pile warps.

It will also be evident that one or several stuffer warps may be used, the stuffer warps being carried along with the pile warps which are in the back of the fabric. This is illustrated in the forms of Figure 7.

In the weave of Figure 7, an additional pile warp 55 is used. While only one end of pile warp 55 may be carried through each dent of the reed (course), I prefer to employ a plurality of pile warp ends in each dent, suitably two, although in many cases three or more ends of the pile warp 55 per dent may be used. Also, as later explained, I prefer to thread-in the pile warps through alternate dents, although in some cases the ends of a given pile warp end may appear in a group of adjoining dents with or without omission in the next group of dents.

In the weave of Figure 7 a stuffer warp 60 is employed, permissibly using only one stuffer warp end per dent, but preferably using two ends per dent (course) and in many cases three, four, five or more ends per dent may be used.

In the first step of the cycle, the single binder warp is raised half way while the pile warps are lowered and the stuffer warp is lowered, forming a lower shed. A shot of weft 45 is taken beneath the single binder warp 30 and above all other warps. In the second step of the cycle, the first pile warp is fully raised, the other pile warps are raised half way and the binder warp is lowered, forming an upper shed and a lower shed. A stuffer warp is also raised half way. A wire is inserted in the upper shed and a shot of weft is taken in the lower shed. The third step is identical with the first step. The fourth step is identical with the second step except that a different pile warp is raised. The fourth step is identical with the first step. The fifth step is identical with the second step except that a still different pile warp is raised. The sixth step is identical with the first step. This completes the cycle. Similarly if there were four pile warps eight steps would be used and with any additional number of pile warps the number of steps in the cycle is twice the number of pile warps.

Figure 7 shows the final weave in which there are transverse rows of pile projections 48 resulting from raising successive pile warps 35, 55 and 40 over wires. The weave of Figure 7 is subject to all the variations illustrated in Figures 1 to 6 inclusive, and can be produced with or without the stuffer warp.

It will be evident that while the stuffer warps are continuous in opposition with the single binder warp, the stuffer warp 60 tends to continue straight through the back of the fabric, whereas the binder warp assumes a zig-zag.

While not essential to the weave of the invention, it is preferable to employ greater tension on the stuffer warp ends than that on the binder warp ends.

With any of the weaves shown, various thread-in combinations can be used of the number of ends in a given dent of the reed and the presence or absence of ends in the adjoining dents. Figure 8 shows the conditions for the pile warps, the single binder warp and the stuffer warp in vertical columns, and in horizontal columns illustrates several thread-in variations. The number of dots in a square indicates the number of ends per dent, subject however, to the variations in Figure 9 as far as the alternating of dent thread-in of pile warps is concerned.

Thread-in No. 1 employs two ends per dent in pile warp A, pile warp B and the single binder warp with no stuffer warp. Thread-in No. 2 is the same, except that it has two ends per dent of the stuffer warp.

Thread-in No. 3 has three ends per dent on all warps, including the stuffer. Thread-in No. 4 employs one end per dent on all warps. Thread-in No. 5 uses two ends per dent of each pile warp, and one end per dent in the single binder warp and the stuffer warp.

Thread-in No. 6 employs one end per dent of the pile warps, two ends per dent of the single binder warp, and one end per dent of the stuffer warp. In thread-in No. 7 there are two ends per dent of the stuffer warp and one end per dent of each other warp.

In the case of the binder warp and the stuffer warp, Figure 8 shows the condition for every dent, but in the case of the pile warps, the condition may prevail in every dent or in alternate dents as shown in Figure 9.

Figure 9 shows in vertical columns the conditions in any six adjoining dents, and in horizontal columns the conditions of all piles far various thread-ins. The number of dots in a rectangle indicate the number of ends of a particular pile in the particular dent.

Thread-in No. 1 employs one end of each of two pile warps in every dent. Thread-in No. 2 uses two ends of each of two pile warps in every dent. It will be understood that the thread-in No. 1 or 2 may be used in certain groups of dents, with other thread-ins in neighboring groups of dents. Thread-in No. 3 employs one end of each of two pile warps in each alternate dent, there being no ends of pile A in the dents receiving pile B and vice versa. Thread-in No. 4 is similar, but it employs two ends in each alternate dent.

Thread-in No. 5 is like thread-in No. 3 except that thread-in No. 5 is for three pile warps having one end in each third dent. Thread-in No. 6 is like thread-in No. 4 except that thread-in No. 6 has three pile warps having two ends in every third dent. In other words, in thread-in Nos. 3 and 4 for two pile warps the alternation is every second dent, and in thread-in Nos. 5 and 6 for three pile warps the alternation is every third dent. For four pile warps the alternation is every fourth dent, etc.

Thread-in Nos. 3, 4, 5 and 6 break up the longitudinal rows of pile and are therefore very desirable. Thread-in No. 4 is preferred, and next to it thread-in No. 6, as these produce a maximum break up in longitudinal lines.

In view of my invention and disclosure variations and modifications to meet individual whim or particular need will doubtless become evident to others skilled in the art, to obtain all or part of the benefits of my invention without copying the process, structure and fabric shown, and I, therefore, claim all such insofar as they fall within the reasonable spirit and scope of my claims.

Having thus described my invention what I claim as new and desire to secure by Letters Patent is:

1. A pile fabric having a single binder warp, a stuffer warp and at least two pile warps interwoven with wefts, the binder warp being woven in opposition to all pile warps, and the stuffer warp following the pile warps in the backing of the fabric and being woven in opposition to the binder warp, a given pile warp being the only pile warp raised in the pile at a given weft position, each pile warp successively being raised in the pile opposite the second weft from that opposite to which the next pile warp is raised and each pile warp then following through the backing of the fabric along with the stuffer warp throughout the successive wefts until all pile warps have been raised and then being raised in the pile, each pile warp being bound behind at least two wefts on either side of a row of pile, and the pile having high and low pile projections.

2. A pile fabric according to claim 1, in which individual rows have high and low pile projections in the same transverse rows, the high pile projections being supported by the bind behind two wefts on either side and by their broad bases.

3. A pile fabric according to claim 1, having a plurality of ends of the same pile warp in an individual course.

4. A pile fabric according to claim 1, having in each course in which each pile warp appears a plurality of ends of that pile warp.

5. A pile fabric according to claim 4, having the pile warp ends threaded in alternate courses.

References Cited in the file of this patent

UNITED STATES PATENTS

| | | |
|---|---|---|
| 413,440 | Firth | Oct. 22, 1889 |
| 1,208,101 | Cradock | Dec. 12, 1916 |
| 1,531,178 | Crossland | Mar. 24, 1925 |
| 1,600,184 | Lafond | Sept. 14, 1926 |
| 2,037,548 | Underwood | Apr. 14, 1936 |
| 2,060,103 | Morgan | Nov. 10, 1936 |
| 2,073,227 | Shearer | Mar. 9, 1937 |
| 2,125,745 | Walsh | Aug. 2, 1938 |
| 2,318,499 | Keen | May 4, 1943 |
| 2,532,903 | Groat | Dec. 5, 1950 |
| 2,553,303 | Crawford | May 15, 1951 |
| 2,571,860 | Gebert | Oct. 16, 1951 |
| 2,576,791 | Jackson | Nov. 27, 1951 |

FOREIGN PATENTS

| | | |
|---|---|---|
| 273,409 | Great Britain | July 6, 1927 |